United States Patent [19]
Yorgin et al.

[11] 3,891,298
[45] June 24, 1975

[54] CLIP CONNECTED TERMINAL LUG

[75] Inventors: Nick Yorgin, Ambridge; Alfred E. Maier, both of Beaver Falls, Pa.

[73] Assignee: Westinghouse Electric Corporation, Pittsburgh, Pa.

[22] Filed: Sept. 17, 1973

[21] Appl. No.: 398,022

[52] U.S. Cl.......... 339/272 R; 339/263 R; 24/259 R
[51] Int. Cl............................................. H01r 7/12
[58] Field of Search.......... 339/272, 263; 24/259 R, 24/259 B

[56] References Cited
UNITED STATES PATENTS

| | | | |
|---|---|---|---|
| 2,285,928 | 6/1942 | Jensen | 339/272 |
| 2,984,818 | 5/1961 | Logan | 339/272 R |
| 3,066,277 | 11/1962 | Edmunds | 339/272 UC |
| 3,076,952 | 2/1963 | Powell | 339/272 |
| 3,387,107 | 6/1968 | DiPilla | 24/259 |
| 3,638,173 | 1/1972 | Middendorf et al. | 339/272 UC |

Primary Examiner—Roy D. Frazier
Assistant Examiner—Robert A. Hafer
Attorney, Agent, or Firm—H. G. Massung

[57] ABSTRACT

A terminal lug is provided for connecting an electric cable to an electric bus conductor in which the terminal lug is held to the electric bus conductor by a U-shaped clip. The terminal lug comprises a body member having a passage formed therein for receiving the electric bus conductor and a portion of the electric cable. A boss is formed in the passage for engaging an opening formed in the bus conductor when the bus conductor is inserted in the passage through the body member. The U-shaped terminal clip holds the bus conductor to a portion of the internal surface of the passage through the body member so that the boss formed in the passage engages the opening in the bus conductor to securely fasten the terminal lug to the bus conductor. A terminal screw extends into the passage through the body member opposite the bus conductor to engage the electric cable and force a portion of the electric cable into good electrical connection with the bus conductor.

14 Claims, 9 Drawing Figures

PATENTED JUN 24 1975　3,891,298

SHEET 1

PATENTED JUN 24 1975 3,891,298

SHEET 2

CLIP CONNECTED TERMINAL LUG

BACKGROUND OF THE INVENTION

This invention relates generally to electric connectors and more particularly to connectors for making terminal connection to circuit interrupters and other circuit controlling devices. The disclosed terminal lug is particularly adaptable for use on circuit interrupters of the molded case circuit breaker variety.

In the art of electric circuit interrupter it is often desirable to have a terminal device supported between relatively high insulating barriers in order to insulate the terminal device from other electrical conductors. It is desirable to support terminal devices between barriers and to provide an end opening so that an electric cable can be moved inward into the opening to be connected to the bus conductor extending from the circuit interrupter. In some prior art circuit interrupters it is the usual practice to connect the terminal lugs to the bus conductor extending from the circuit breaker by a screw which engages a tapped hole in either the bus conductor or the terminal lug. The terminal lug is often mounted above the bus conductor with a screw passing through the bus conductor and engaging a tapped hole in the terminal lug so as to fasten the bus conductor to the bottom of the terminal lug. This type of arrangement has the disadvantage that the terminal lug must act as a conductor; and an electric cable is not directly connected to the bus conductor. That is, the terminal screw which engages the electric cable to secure the electric cable to the terminal lug does not apply pressure to improve the contact between the terminal lug and the electric bus conductor. It is desirable to have a terminal lug in which the electric cable conductor is directly connected to the electric bus conductor and in which the terminal screw, which retains the electric cable within the terminal lug as it is tightened, increases the pressure between the electric bus conductor and the electric cable. It is also desirable to have a terminal lug which can be quickly connected to the bus conductor extending from the circuit interrupter without the use of screws, tapped holes or special nuts. It is desirable to have a terminal lug which can be quickly removed from the bus conductor extending from the circuit interrupter when desired, such as for instance, when a connection is to be made directly to copper straps or used with rear mounting studs. It is desirable that as the terminal screw is tightened, the electric contact pressure between the terminal bus coming from the molded case circuit breaker and the electric cable is increased proportionally.

SUMMARY OF THE INVENTION

A terminal lug for connecting an electric cable conductor to an electric bus conductor is provided. The terminal lug comprises a body member having a passage formed therethrough into which a portion of the electric cable conductor is inserted. A boss is formed in the passage through the body member for engaging an opening formed in the electric bus conductor when the terminal lug is attached to the bus conductor. Spring means are provided for maintaining the boss in engagement with the opening formed in the electric bus conductor so that the terminal lug is securely fastened to the electric bus conductor. A terminal screw passes through the end of the body member, opposite the boss, for forcing the portion of the electric cable inserted into the terminal lug into high pressure engagement with the bus conductor, as the terminal screw is tightened. Thus, the cable conductor makes direct electrical contact with the bus conductor.

The spring means for maintaining the boss in engagement with the opening through the electric bus conductor can be a lug clip having a generally U-shaped portion. The lug clip is inserted so that a portion of the bus conductor and one end of the terminal lug are maintained between the legs of the U. This holds the bus conductor to a portion of the inside surface of the passage through the body member so that the boss engages the opening formed in the bus conductor. The leg of the U-shaped terminal clip which extends inside the passage of the body member can have the center portion removed so that the electric cable conductor makes direct contact with the terminal conductor. In this embodiment the portion of the U-shaped lug clip which extends inside the passage of the body member is formed by two relatively thin sections. Since the U-shaped lug clip does not carry any current, it can be formed from a nonconductor or a poor conductor, such as spring steel. This permits the lug-shaped clip to be formed from material having excellent spring characteristics and to be relatively inexpensive.

The leg of the U-shaped lug clip which extends against the outside end of the body member is flat and slightly longer than the width of the end of the body member and the inner leg of the U. A lip is formed at the free end of the outside leg to engage a side of the body member. The outside leg of the U-shaped lug clip has an opening formed therethrough which overlaps a depression formed in the bottom of the body member so that the U-shaped lug clip can easily be pried away from the terminal lug for quick removal.

The disclosed terminal lug is particularly useful for use on a molded case circuit breaker wherein a bus conductor extends from the circuit breaker between relatively high insulating barriers. The disclosed terminal lugs can be easily installed by working from the end of the circuit breaker to which the electric cables are to be connected.

It is an object of this invention is to provide a terminal lug which can be quickly assembled to a bus conductor without the use of a screw, a tapped hole, or a special connecting nut.

It is a further object of this invention to provide a terminal lug which can be quickly and easily removed from the bus terminals of a circuit interrupter when required.

It is still a further object of this invention to provide a terminal lug for use on molded case circuit breakers which provides for direct connection between the bus conductor coming from the circuit breaker and the electric cable to which it is connected.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENTS

Figure 1:
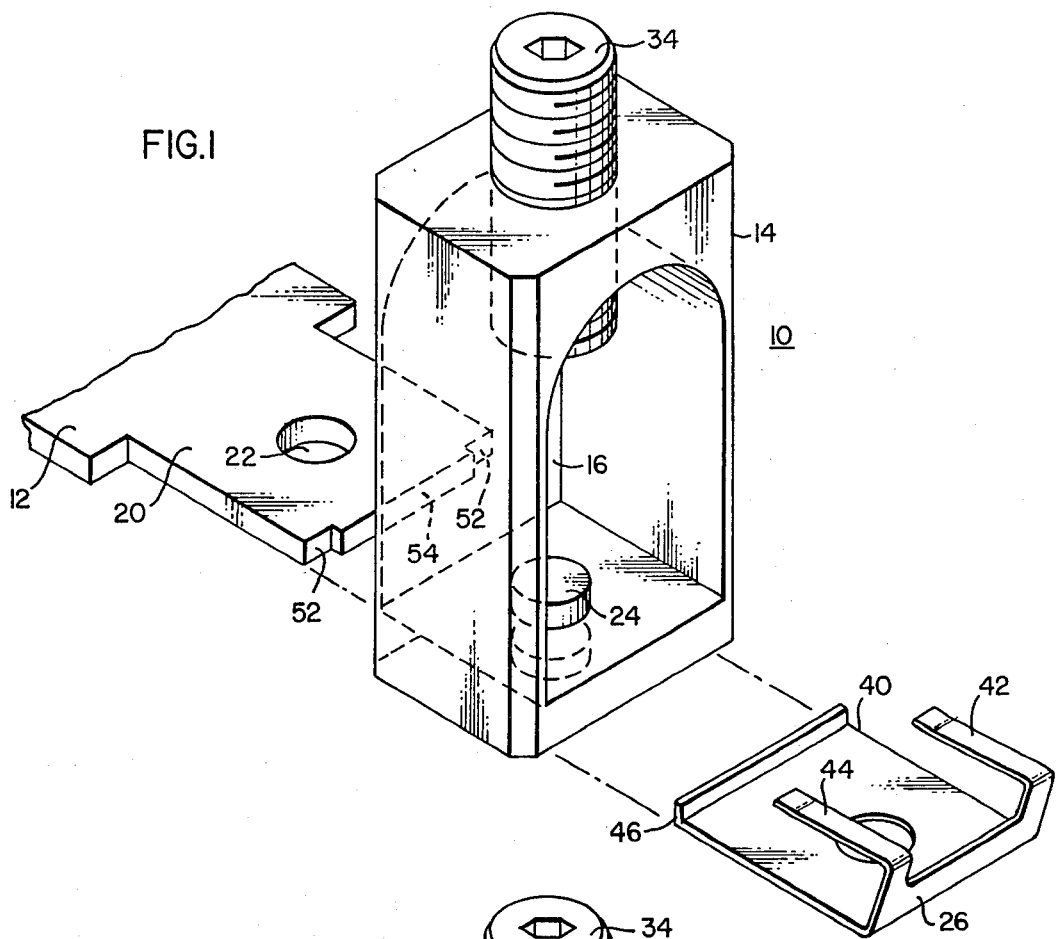
FIG. 1 is an exploded perspective view of a lug clip assembly constructed in accordance with the teaching of this invention.
Figure 2:
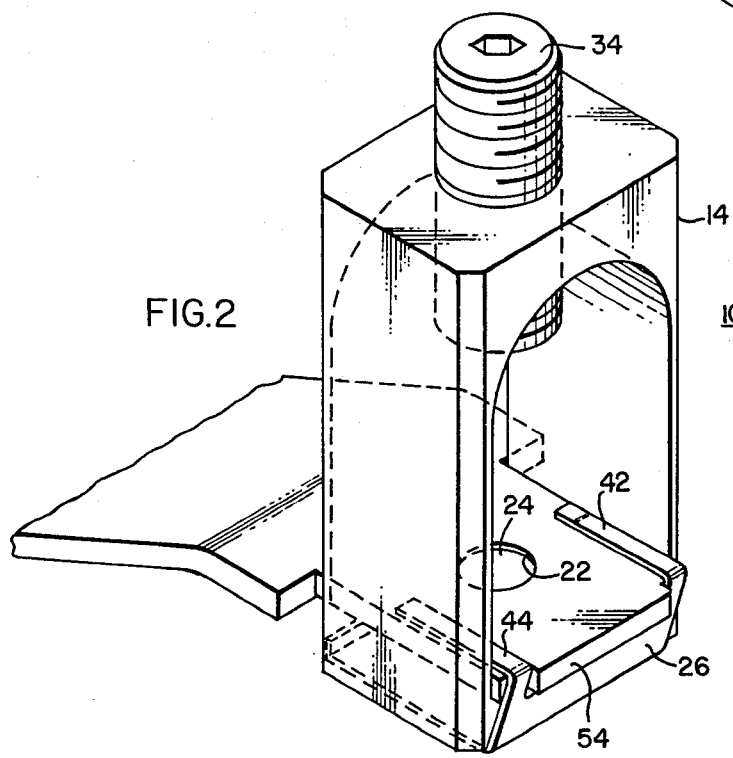
FIG. 2 is a perspective view similar to FIG. 1 with the lug clip attached to the bus conductor.
Figure 5:
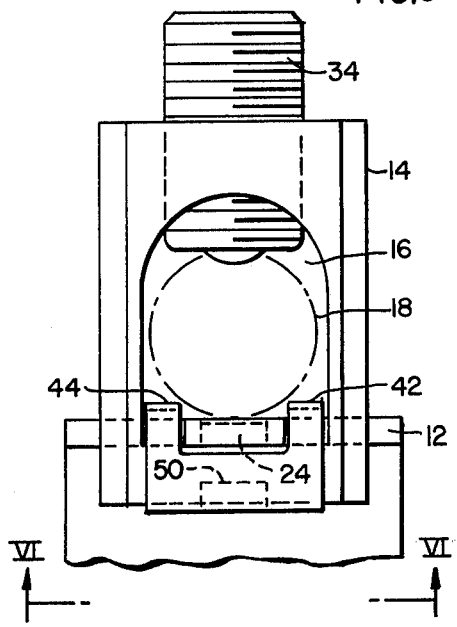
FIG. 5 is an end view the terminal lug shown in FIG. 2.

Referring now to the drawings and FIGS. 1 and 2 in particular there is shown a terminal lug assembly 10 for connecting an electric cable conductor to an electric bus conductor 12. Terminal lug 10 comprises a body member 14 having a passage 16 formed therethrough. As can best be seen in FIG. 5, body member 14 has a generally rectangular cross sectional area. The passage 16 is formed to receive a cable conductor 18 as indicated by phantom lines in FIG. 5. Bus conductor 12 has a portion 20 having an opening 22 formed therein which is disposed within the passage 16 through body member 14. Body member 14 has a boss portion 24 raised from the bottom of the inside surface of passage 16. As can best be seen in FIG. 2 when the bus conductor 12 is inserted in the passage 16 of body member 14, boss 24 projects within opening 22. A U-shaped spring clip 26 is provided for holding bus conductor 12 in engagement with the bottom of passage 16 so that boss 24 projects into opening 22. This securely fastens lug assembly 10 to bus conductor 12.

Figure 4:
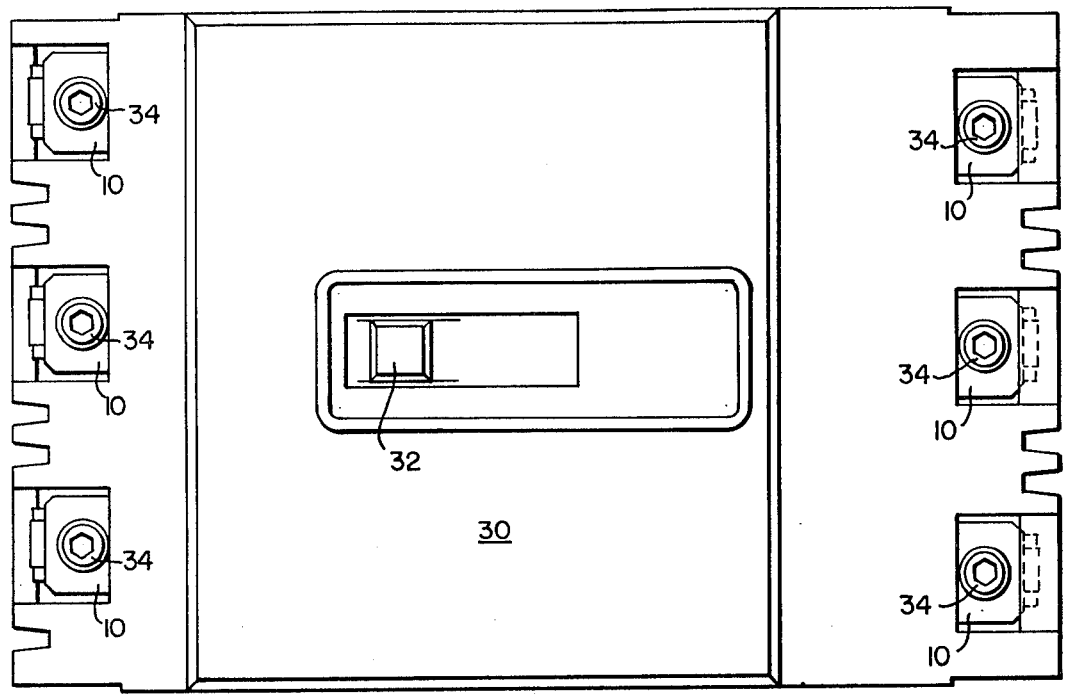
FIG. 4 is a top view of FIG. 3 showing the terminal lug attached.
Figure 3:
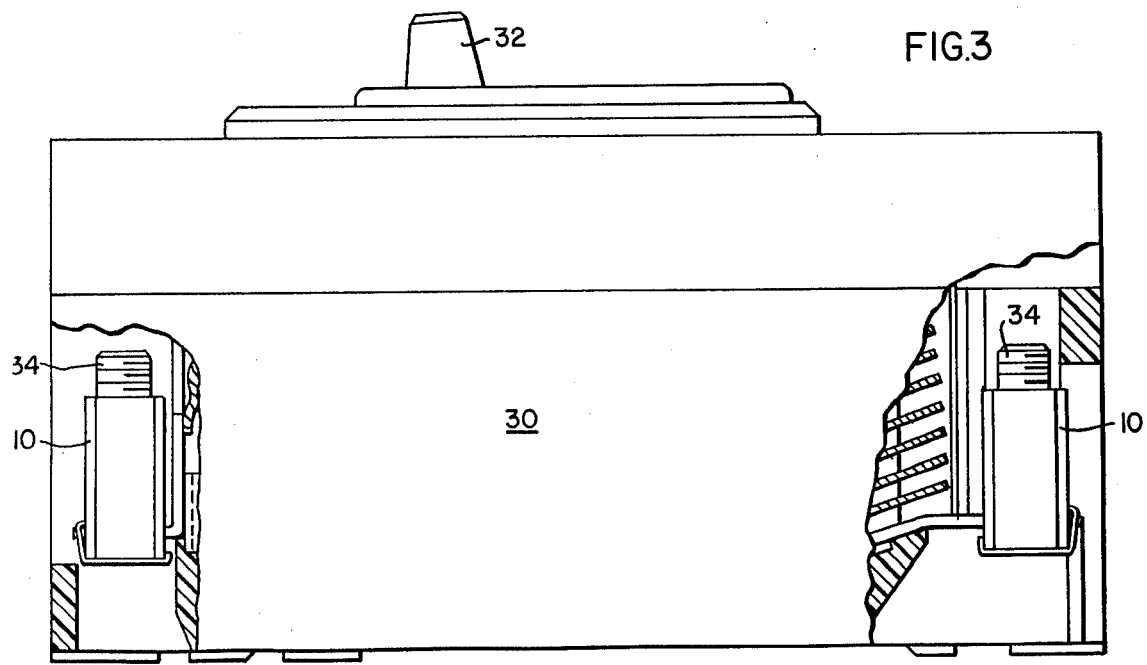
FIg. 3 is a side view of a molded case circuit breaker with portions broken away and omitted for clarity showing the disclosed terminal lug attached.

Terminal lug 10 is particularly adaptable for use on a circuit breaker 30 as shown in FIGS. 3 and 4. For a three-phase circuit breaker 30 with terminal lugs on line and load side, six terminal lugs 10 are required per breaker 30. Cables to be connected to circuit breaker 30 are inserted enwise into terminal lug 10. Circuit breaker 30 is manually operated to the open and closed positions by operation of the operating member 32, and automatically tripped open in response to overcurrent loads by operation of an internal trip device. The operation of the operating mechanism and trip device is more specifically described in U.S. Pat. Nos. 3,480,900 and 3,492,614 which are assigned to the same assignee as the present application.

A terminal screw 34 is provided at the end of body member 14 opposite boss 24. With the bus conductor 12 and electric cable 18 in position within the opening 16 of body member 14, as terminal screw 34 is tightened, electric wire or cable 18 is forced into high pressure engagement with bus conductor 12. With the embodiment shown in FIGS. 1 through 6, the electric cable makes direct contact with bus conductor 12 and as terminal screw 34 is tightened, the contact pressure between bus conductor 12 and electric wire 18 increases proportionally. Tightening of terminal screw 34 tightens the connection between bus conductor 12 and electric cable 18.

Figure 7:
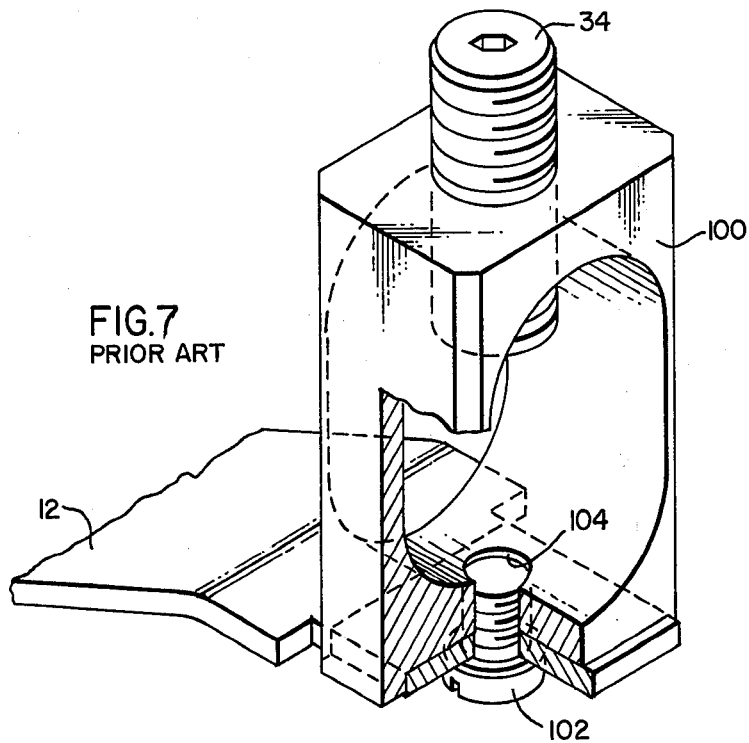
FIG. 7 is a perspective view of a prior art terminal lug.

Lug clip 26 which holds body member 14 in engagement with portion 20 of bus conductor 12 is generally U-shaped. FIG. 7 indicates a prior art type terminal connector which is in general use on molded case circuit breaker. This terminal lug 100 shown in FIG. 7 is held to bus conductor 12 by means of a screw 102 which engages a tap opening 104 formed in terminal lug 100. Terminal 100 is mounted on top of bus conductor 12. Bus conductor 12 is only secured to terminal lug 100 by screw 102. That is, bus conductor 12 is connected externally to terminal lug 100 so that as terminal screw 34 is tightened, the contact pressure between electric cable 18 and bus conductor 12 is not increased. The prior art terminal connector 100 as shown in FIG. 7 has the disadvantage that as terminal screw 34 is tightened lug 100 can be moved slightly and possibly loosen the connection between terminal lug 100 and bus conductor 12. Terminal lug 100 also requires a tapped hole 104 to engage connecting screw 102.

Terminal lug 10 as shown in FIGS. 1 through 6 is held to bus conductor 12 by lug clip 26. Generally U-shaped lug clip 26 retains bus conductor 12 at the bottom of body member 14 between the legs of the U. The legs of the U-shaped lug connector 26 which extends into the passage 16 of body member 14 are shorter than the legs which extend external to body member 14. The center of the internal projecting leg is removed leaving two rather narrow spring portions 42 and 44 which projects internal of passage 16. Removing the material between the portions 42 and 44 permits the electric cable 18 to make direct contact with the bus conductor 12.

Figure 6:
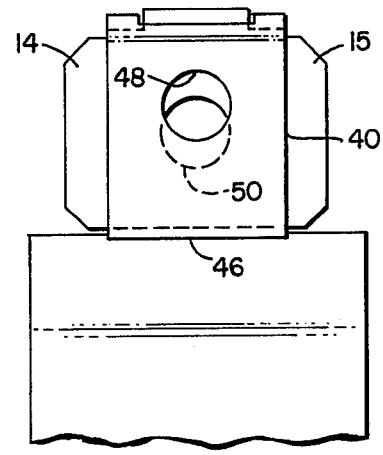
FIG. 6 is a bottom view of the terminal assembly shown in FIG. 2.

As can best be seen in FIG. 6, the bottom leg 40 of lug clip 26 is slightly longer than the bottom 15 of body member 14. A lip 46 is formed at the free end of leg 40. With the bus conductor 12 properly disposed within the opening 16 through body member 14 and terminal clip 26 in place lip 46 snaps around the bottom of body member 14 to securely hold lug clip 26 in place. Since lug clip 26 is not a current carrying member, it can be made from a nonconducting or a poor electrically conducting material, such as spring steel. External leg 40 is flat and has an opening 48 formed therethrough. With lug clip 26 in place this opening 48 partially overlaps a depression 50 formed in the outside bottom surface 15 of body member 14. As can best be seen in FIG. 6, opening 48 partially overlaps depression 50. This allows a screw driver or other instruments to be easily inserted through opening 48 to force the lip 46 down and out of engagement with body member 14, thus allowing lug clip 26 to be quickly and easily pried away from body member 14 and removed. Thus it can be seen that terminal lug 10 can be quickly and easily assembled to bus conductor 12 without the use of screws tapped holes, or special nuts.

Portion 20 of bus conductor 12 which extends into passage 16 has two notch portions 52 formed at the free end thereof. These notches 52 help locate portions 42 and 44 when lug clip 26 is inserted. The end clip 54 of portion 20 extends beyond lug clip 26, this facilitates insertion of electric wire or cable 18 into the passage 16 through body member 14.

Figure 8:
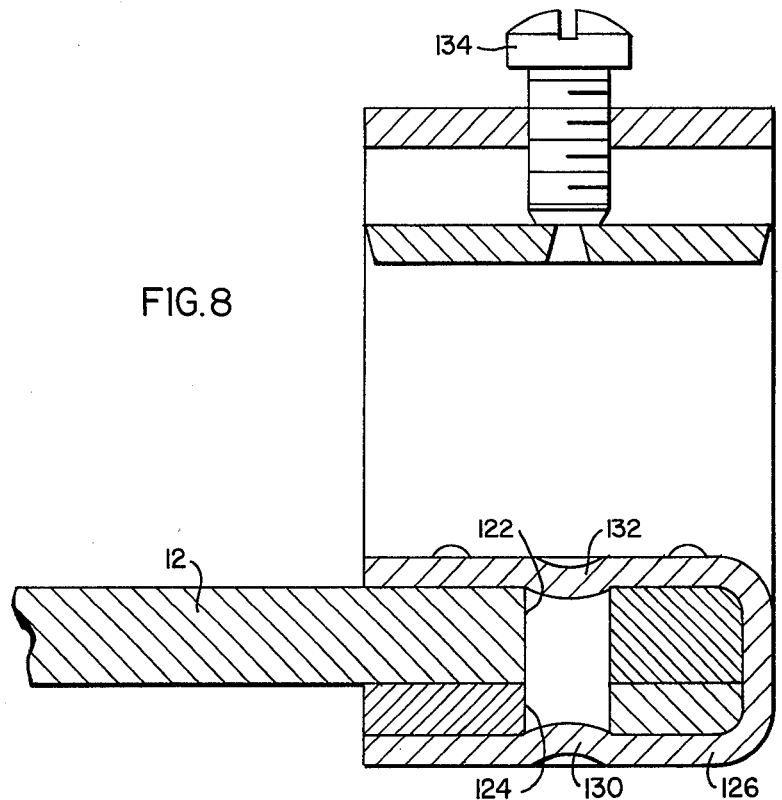
FIG. 8 is a side sectional view of a terminal lug showing a different embodiment of the invention.
Figure 9:
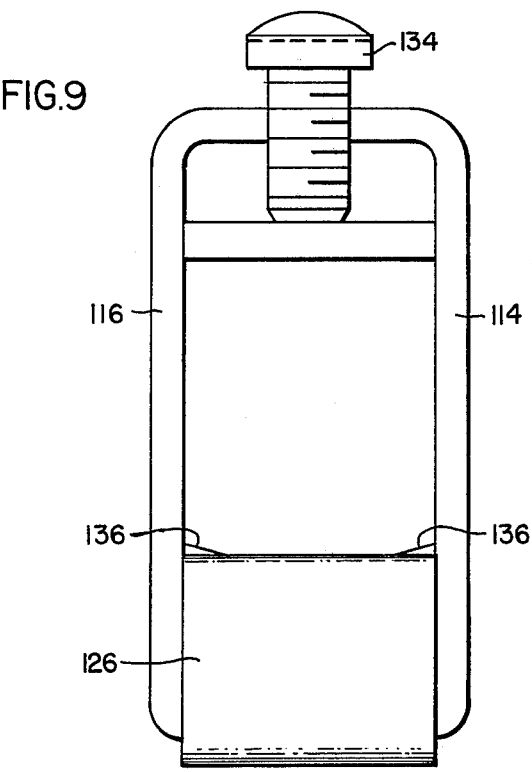
FIG. 9 is an end view of the terminal shown in FIG. 8.

Referring now to FIGS. 8 and 9, there is shown another embodiment of the invention. Body member 114 has an opening 116 formed therethrough, the U-shaped terminal clip 126 secures body member 114 to bus conductor 12. Bus conductor 12 and body member 114 have openings 122 and 124 respectively formed therein. A depression 130 in lug clip 126 engages opening 124 in body member 114. Another depression 132 engages an opening 122 in bus conductor 12. Depressions 130 and 132 engaging openings 122 and 124 securely hold lug clip 114 to bus conductor 12. Since lug clip 126 is disposed between bus conductor 12 and the electric cable 18 inserted in opening 116 it must be of a conductive material, such as spring brass. Bumps 136 can additionally be formed on the lug clip 126 to hold any wires or cables inserted in passage 116. A terminal screw 134 is provided to close passage 116 when tightened and hold any cable inserted in passage 116. Lug clip 126 presents a rounded edge to the cable as it is inserted in passage 116. A tight joint between the cable and the bus conductor 12 is assured since the pressure applied by terminal screw 134 is transmitted directly from the cable to the clip to the bus conductor 12.

As can be seen, the disclosed invention provides a terminal lug which can quickly and easily be assembled or removed from the bus conductor 12. This saves assembly time, the cost of screws, tapped holes or special nuts. Quick removal of terminal lug 10 when required as when the circuit breaker 30 is to be mounted correctly to copper straps or studs is facilitated. A tight connection between cable conductor 18 and bus conductor 12 is assured since as terminal screw 34 or 134 is tightened the pressure cable 18 and bus conductor 12 is increased. Lug clip 26 can be made from an inexpensive high quality material, such as spring steel to reduce assembly cost. When lug clip 26 is used, direct contact is made between the electric wire of cable 18 and the bus conductor 12. This helps assure that good electrical contact is made between bus conductor 12 and cable 18.

We claim:

1. A terminal lug for connecting an electric cable conductor to an electric bus conductor comprising:

a body member being generally rectangular shaped and having a passage formed therethrough in which a portion of the electric bus conductor and a portion of the electric cable conductor are to be disposed;

a boss formed in the passage of said body member for engaging the electric bus conductor portion which is disposed in the passage of said body member;

spring means for maintaining said boss in engagement with the electric bus conductor and for fastening the terminal lug to the electric bus conductor;

a terminal screw passing through the top end of said body member for forcing the portion of the electric cable conductor disposed in the passage of said body member into good electrical contact with the portion of the electric bus conductor disposed in the passage of said body member;

said spring means comprises a lug clip having a generally U-shaped cross sectional area and being constructed from a spring metallic material;

said lug clip disposed so that one leg of the U-shaped lug clip extends into the passage of said body member above the portion of the electric bus conductor disposed in the passage and the other leg of the U-shaped lug clip extends over the outside end of said body member to hold the portion of the electric bus conductor which is disposed in the passage formed in said body member against the inner surface of the passage at one end of said body member;

the portion of the electric bus disposed in the passage is flat and has an opening formed therethrough;

said boss formed in the passage of said body member projects into the opening formed through the electric bus which in cooperation with said U-shaped lug clip secures said terminal lug to the electric bus conductor and prevents any substantial movement of the terminal lug with respect to the electric bus conductor;

the leg of the U-shaped lug clip which is disposed against the outside end of said body member being flat and slightly longer than the width of the end of said body member;

a lip formed at the free end of the outside leg of said U-shaped portion; and, said lip extending over the end of said body member and engaging a portion of one side of said body member to tightly hold said U-shaped lug clip in place.

2. A terminal lug for connecting an electric cable conductor to an electric bus conductor as claimed in claim 1, wherein:

the flat outside leg of said U-shaped lug clip has a hole therethrough;

the bottom outside end of said body member has a depression formed therein; and with said U-shaped lug clip in place a portion of the hole through the flat outside leg of said U-shaped lug overlaps the depression formed in the bottom outside end of said body member.

3. A terminal lug for connecting an electric cable conductor to an electric bus conductor as claimed in claim 1, wherein:

the leg of said U-shaped lug clip which extends into the passage of said body member is of a generally flat shape having the center portion removed so the electric cable conductor directly engages the electric bus conductor.

4. A terminal lug for connecting an electric cable conductor to an electric bus conductor as claimed in claim 1, wherein the leg of the U-shaped lug clip which extends into the passage of said body member comprises:

a first portion extending partially through the passage parallel with, and in close proximity to, one of the sides of the passage through said body member; and, a second portion spaced apart from said first portion and extending partially through the passage parallel with and in close proximity to the other side of the passage through said body member.

5. A terminal lug for connecting an electric cable conductor to an electric bus conductor as claimed in claim 1, wherein:

said lug clip is formed from spring steel.

6. A terminal connector for electrically connecting an electric wire conductor to a flat bus conductor comprising:

a body member having an opening formed therein to receive said flat bus conductor and said electric wire conductor;

spring means for forcing said body member into engagement with said bus conductor;

a terminal screw extending through one end of said body member and projecting into the opening formed in said body member to force said electric wire conductor into engagement with said flat bus conductor;

a raised portion formed internal of the opening formed in said body member;

the flat bus conductor includes a shaped portion, having a hole therein, which extends into the opening in said body member;

said raised portion extending into the hole formed in said flat bus conductor when said terminal lug is in place restricts movement of said terminal lug with respect to the flat bus conductor;

said spring means comprises a U-shaped terminal clip with one leg of said U-shaped terminal extending into the opening formed in the body member above the portion of the flat bus conductor which extends into the opening and the other leg of U-shaped terminal clip extending outside of said body member whereby the portion of said flat bus member extending into the opening in said body member is retained by said U-shaped terminal clip against the inner surface of the opening in said body member;

said U-shaped clip is formed from a metallic spring material; and the leg of said U-shaped terminal clip which extends into the opening of said body member comprises a pair of spaced apart leg portions which allow the electric wire conductor to make direct contact with the flat bus conductor.

7. A terminal connector for electrically connecting an electric wire conductor to a flat bus conductor as claimed in claim 6, wherein:

a lip is formed on the leg of the U-shaped terminal clip which extends outside of the body member; and said lip engages the body member when said U-shaped terminal clip is installed to retain said U-shaped terminal clip to said body member.

8. A terminal connector as claimed in claim 6 wherein:

said U-shaped terminal clip is formed from spring steel.

9. A circuit interrupter comprising:
an insulating housing,
a pair of contacts disposed within said housing and being separable to interrupt an electric circuit;
a conductor connected to one of said pair of contacts and extending from said insulating housing;
terminal means connected to said conductor to facilitate connection of said circuit interrupter in an electric circuit; and said terminal means comprising,
a body member having an opening formed therein, in which is disposed the free end of said conductor;
spring means for holding the free end of said conductor in contact with the inner surface of the opening formed in said body member;
a terminal screw extending through one end of said body member and projecting into the opening formed in said body member to facilitate connection to an electric circuit; and
said spring means comprising a U-shaped clip with one leg of the U-shaped clip having separate and spaced apart legs extending near the opposite sidewalls of the opening in said body member.

10. A circuit interrupter as claimed in claim 9, wherein:

a boss is formed on the inner surface of the opening formed in said body member; and the free end of said conductor has a hole formed therein which is engaged by said boss when the free end of said conductor is disposed in the opening formed in said body member and said spring means is in place.

11. A circuit interrupter as claimed in claim 9, wherein: said spring means comprises:

a U-shaped clip with an inner leg of said U-shaped clip extending in the opening of said body member above the free end of said conductor and an outer leg of said U-shaped member extending to the outside surface of said body member so that the free end of said conductor and a portion of said body member are sandwiched between the legs of said U-shaped clip; and said U-shaped clip is formed from a spring material.

12. A circuit interrupter comprising:
an insulating housing,
a pair of contacts disposed within said housing and being separable to interrupt an electric circuit;
a conductor connected to one of said pair of contacts and extending from said insulating housing;
terminal means connected to said conductor to facilitate connection of said circuit interrupter in an electric circuit; and said terminal means comprising,
a body member having an opening formed therein, in which is disposed the free end of said conductor;
spring means for holding the free end of said conductor in contact with the inner surface of the opening formed in said body member;
a terminal screw extending through one end of said body member and projecting into the opening formed in said body member to facilitate connection to an electric circuit;
a U-shaped clip formed from a spring material with an inner leg of said U-shaped clip extending in the opening of said body member above the free end of said conductor and an outer leg of said U-shaped member extending to the outside surface of said body member so that the free end of said conductor and a portion of said body member are sandwiched between the legs of said U-shaped clip;
the leg of said U-shaped clip which extends into the opening formed in said body member comprises two spaced apart portions running substantially parallel to the opening; and,
a lip is formed on the outside leg of said U-shaped clip for engaging a portion of said body member to secure said U-shaped clip to said body member.

13. A circuit interrupter comprising:
an insulating housing,
a pair of contacts disposed within said housing and being separable to interrupt an electric circuit;
a conductor connected to one of said pair of contacts and extending from said insulating housing;
terminal means connected to said conductor to facilitate connection of said circuit interrupter in an electric circuit; and said terminal means comprising,
a body member having an opening formed therein, in which is disposed the free end of said conductor;
spring means for holding the free end of said conductor in contact with the inner surface of the opening formed in said body member;

a terminal screw extending through one end of said body member and projecting into the opening formed in said body member to facilitate connection to an electric circuit;

said spring means comprises a U-shaped clip formed from a spring material with an inner leg of said U-shaped clip extending in the opening of said body member above the free end of said conductor and an outer leg of said U-shaped member extending to the outside surface of said body member so that the free end of said conductor and a portion of said body member are sandwiched between the legs of said U-shaped clip; and, the inner leg of said U-shaped clip has an indentation formed therein for engaging the free end of said conductor.

14. A circuit interrupter as claimed in claim 13, wherein:

the outer leg of said U-shaped clip has an indentation formed therein for engaging said body member.

* * * * *